(12) United States Patent
Csutak

(10) Patent No.: US 7,796,263 B2
(45) Date of Patent: Sep. 14, 2010

(54) METHOD AND APPARATUS FOR DETERMINING FLUID CONTENT DOWNHOLE

(75) Inventor: Sebastian Csutak, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 345 days.

(21) Appl. No.: 11/850,455

(22) Filed: Sep. 5, 2007

(65) Prior Publication Data

US 2009/0056434 A1 Mar. 5, 2009

(51) Int. Cl.
G01N 21/00 (2006.01)
(52) U.S. Cl. ..................................................... 356/436
(58) Field of Classification Search ................. None
See application file for complete search history.

(56) References Cited

U.S. PATENT DOCUMENTS

| 5,452,314 | A | 9/1995 | Aronson |
| 5,764,679 | A | 6/1998 | Shen et al. |
| 6,650,675 | B2 | 11/2003 | Sahara et al. |
| 6,700,910 | B1 | 3/2004 | Aoki et al. |
| 6,731,424 | B1 | 5/2004 | Wu |
| 6,996,144 | B2 | 2/2006 | Tayebati |
| 7,279,678 | B2 | 10/2007 | Andrews et al. |
| 2005/0111852 | A1* | 5/2005 | Mahgerefteh et al. ....... 398/187 |
| 2005/0237005 | A1 | 10/2005 | Maxik |
| 2006/0139646 | A1 | 6/2006 | DiFoggio |

FOREIGN PATENT DOCUMENTS

| GB | 2353591 | 2/2001 |
| GB | 2426579 | 11/2006 |

OTHER PUBLICATIONS

International Search Report for International Application No. PCT/US2008/075614. Mailed Nov. 18, 2008.
Written Opinion of the International Searching Authority for International Application No. PCT/US2008/075614. Mailed Nov. 18, 2008.

* cited by examiner

Primary Examiner—Gregory J Toatley, Jr.
Assistant Examiner—Juan D Valentin
(74) Attorney, Agent, or Firm—Cantor Colburn LLP

(57) ABSTRACT

Method and apparatus for estimating a downhole fluid parameter include a high-gain semiconductor light emitter device conveyed into a well borehole, a semiconductor light emitter having a gain region that produces light having a first center wavelength responsive to a selected fluid property, the semiconductor light emitter being carried by the carrier. The apparatus may include an electrical current source that applies an electrical current pulse train to the semiconductor light emitter and an analyzer device that analyses a first response of light emitted from the semiconductor light source after emitted light interacts with the fluid, the analyzed first response being used to estimate the fluid property using the first center wavelength. A current modulator modulates the electrical current pulse train to vary a temperature of the gain region to change the first center wavelength in the emitted light to a second center wavelength and a second response of the emitted light is analyzed by the analyzer device after interaction with the fluid to estimate the fluid property using the second center wavelength.

22 Claims, 5 Drawing Sheets

METHOD AND APPARATUS FOR DETERMINING FLUID CONTENT DOWNHOLE

BACKGROUND

1. Technical Field

The present disclosure generally relates to well bore tools and in particular to methods and apparatus for estimating fluid properties downhole.

2. Background Information

Oil and gas wells have been drilled at depths ranging from a few thousand feet to as deep as 5 miles. Wireline and drilling tools often incorporate various sensors, instruments and control devices in order to carry out any number of downhole operations. These operations may include formation testing, fluid analysis, and tool monitoring and control.

Formation testing may include any number of evaluations and estimations. In some cases, it is desirable to understand fluid content for formation fluids produced from a subterranean formation and/or the content of drilling fluids used during drilling operations.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is a method for estimating a fluid property downhole. The method includes conveying a semiconductor light emitter in a well borehole, the semiconductor light emitter having a gain region that produces light and emitting a light from the semiconductor light emitter toward a fluid sample, the emitted light having a first center wavelength responsive to a selected fluid property. The method further includes applying an electrical current pulse train to the semiconductor light emitter and analyzing a first response of the emitted light after interaction with the fluid sample to estimate the fluid property using the first center wavelength. The electrical current pulse train is modulated to vary a temperature of the gain region to change the first center wavelength in the emitted light to a second center wavelength. A second response of the emitted light is analyzed after interaction with the fluid to estimate the fluid property using the second center wavelength.

In another aspect, an apparatus for estimating a fluid property downhole includes a carrier that conveys one or more tools into a well borehole, a semiconductor light emitter having a gain region that produces light having a first center wavelength responsive to a selected fluid property, the semiconductor light emitter being carried by the carrier. The apparatus may include an electrical current source that applies an electrical current pulse train to the semiconductor light emitter and an analyzer device that analyses a first response of light emitted from the semiconductor light source after emitted light interacts with the fluid, the analyzed first response being used to estimate the fluid property using the first center wavelength. A current modulator modulates the electrical current pulse train to vary a temperature of the gain region to change the first center wavelength in the emitted light to a second center wavelength and a second response of the emitted light is analyzed by the analyzer device after interaction with the fluid to estimate the fluid property using the second center wavelength.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

The present disclosure uses terms, the meaning of which terms will aid in providing an understanding of the discussion herein. As used herein, the term duty cycle refers to the percentage of time that a varying power source is in a "high" state with respect to a "low" state. For example, a square wave with a 50% duty cycle is substantially symmetrical in that the high state time is equal to the low state time. A square wave that is high 60% of the time and low 40% of the time is said to have a 60% duty cycle.

Figure 1:
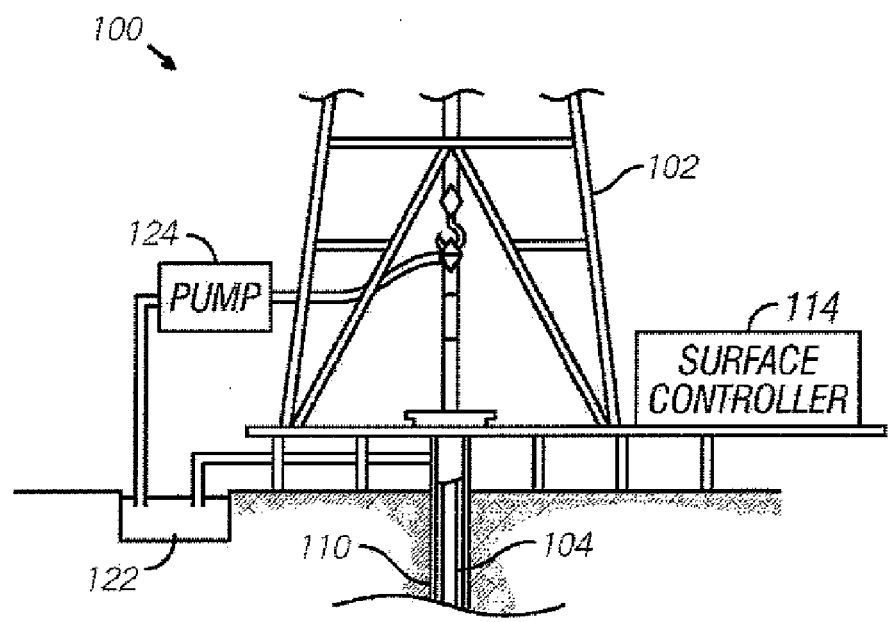
FIG. 1 illustrates a non-limiting example of a drilling system in a measurement-while-drilling (MWD) arrangement according to one embodiment of the disclosure.
Figure 1:
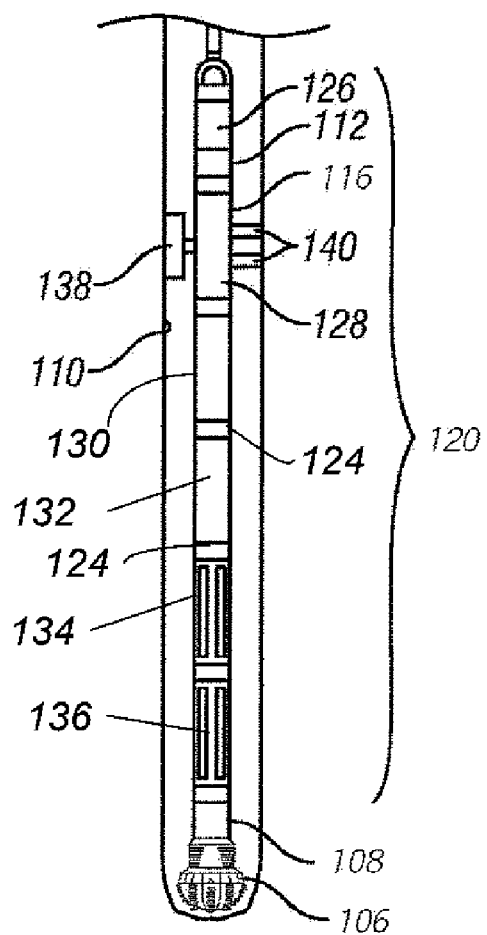

FIG. 1 illustrates an operational environment for devices disclosed herein. Shown is a non-limiting example of a drilling system 100 in a measurement-while-drilling (MWD) arrangement according to one embodiment of the disclosure. A derrick 102 supports a drill string 104, which may be a coiled tube or drill pipe. The drill string 104 may convey a tool carrier such as a bottom hole assembly (BHA) 120. A drill bit 106 is disposed at a distal end of the drill string 104 for drilling a borehole 110 through earth formations.

Drilling operations according to several embodiments may include pumping drilling fluid or "mud" from a mud pit 122, and using a circulation system 124, circulating the mud through an inner bore of the drill string 104. The mud exits the drill string 104 at the drill bit 106 and returns to the surface through an annular space between the drill string 104 and inner wall of the borehole 110. The drilling fluid is designed to provide the hydrostatic pressure that is greater than the formation pressure to avoid blowouts. The pressurized drilling fluid may further be used to drive a drilling motor 108 and may provide lubrication to various elements of the drill string 104.

In the non-limiting embodiment of FIG. 1, the BHA 120 includes a formation evaluation while drilling tool 116. The formation evaluation tool 116 may carry a fluid extractor 128 including a probe 138 and opposing feet 140. In several embodiments to be described in further detail later, the tool 116 includes a downhole spectrometer. Although shown in the example as being carried by a drill string 104, the tool may be conveyed into the well borehole 110 via a wireline.

A downhole tool controller 112 may be used to control the formation evaluation tool 116 and the downhole tool controller 112 may be in two-way communication with a surface controller 114. The controllers 112, 114 may each include a processor, such as within a computer or a microprocessor. The downhole controller 112 may include a memory for storing information downhole for later evaluation at the surface. The surface controller may include a storage device, data storage devices, such as solid state memory and magnetic tapes. Peripherals, such as data input devices and display devices, and other circuitry for controlling and processing data received from the formation evaluation tool 116 may also be included in the surface controller 114. The surface controller 114 and/or the downhole controller may further include one or more computer programs embedded in a computer-readable medium accessible to the associated processor in the controller 112,114 for executing instructions contained in the computer programs to perform the various methods and functions associated with the processing of the data from the formation evaluation tool 116.

The formation evaluation tool 116 lower portion may include an assembly of several tool segments that are joined end-to-end by threaded sleeves or mutual compression unions 124. An assembly of tool segments appropriate for the present invention may include a hydraulic, electrical or electromechanical power unit 126 and a formation fluid extractor 128. A large displacement volume motor/pump unit 130 may be provided below the extractor 128 for line purging. A similar motor/pump unit 132 having a smaller displacement volume may be included in the tool in a suitable location, such as below the large volume pump, for quantitatively monitoring fluid received by the tool 120. One or more sample tank magazine sections 134 may be included for retaining fluid samples from the small volume pump 132. Each magazine section 134 may have several fluid sample tanks 136.

The formation fluid extractor 128 may comprise an extensible suction probe 138 that is opposed by bore wall feet 140. Both, the suction probe 138 and the opposing feet 140 may be hydraulically or electro-mechanically extensible to firmly engage the well borehole wall. Construction and operational details of a suitable fluid extraction tool 128 are more described by U.S. Pat. No. 5,303,775, the specification of which is incorporated herein by reference.

Figure 2:
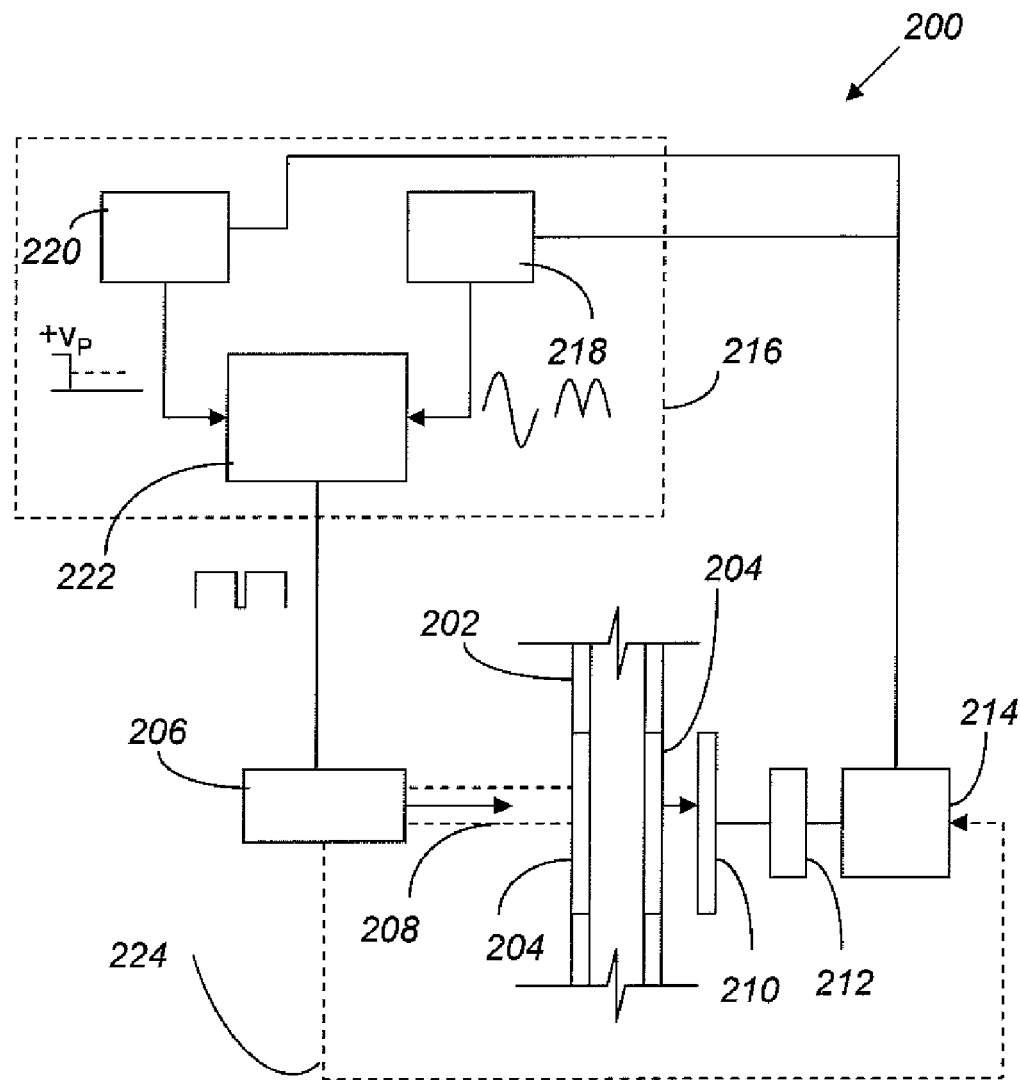
FIG. 2 schematically represents a non-limiting example of an optical tool for estimating a fluid property.

FIG. 2 illustrates one non-limiting embodiment of a downhole optical tool 200 that may be carried by the drilling system 100 described above and shown in FIG. 1 or by a wireline for determining a property of a fluid downhole. The tool 200 includes a fluid cell 202. Fluid in the fluid cell may be stationary or flowing and may include drilling fluid, return fluid, substantially pristine formation fluid or any combination of these fluids. The fluid cell 202 may include one or more optical windows 204 depending on the particular configuration of the tool 200. For example, the tool may be configured for reflectometry or for absorbance tests as shown here.

A semiconductor light emitter 206 includes a high-gain region that emits a light toward the fluid cell 202. The semiconductor light emitter 206 may be selected from any number of suitable semiconductor light emitters. The semiconductor light emitter may include an edge-emitting laser diode or diode array. In one embodiment, the semiconductor light emitter may be a Vertical-Cavity Surface-Emitting Laser ("VCSEL") device that emits coherent light through a window in a top electrode. In other embodiments the semiconductor light emitter may be a non-laser device. The semiconductor may be have two, three or more electrodes that are used to control light emission and/or temperature as described later in the present disclosure.

Continuing with the example of FIG. 2, light may be conveyed toward the fluid cell 202 via an optical path 208. In one embodiment, the optical path 208 includes free space. In one embodiment, the optical path 208 includes an optical fiber.

A photodetector 210 detects the emitted light after the emitted light interacts with fluid in the fluid cell 202. In the example shown, the photodetector 210 is coupled to signal a conditioning circuit 212 and the signal conditioning circuit is coupled to a downhole processor/controller 214.

The light emitted from the semiconductor light emitter 206 has a center wavelength $\lambda c$. In one embodiment, the semiconductor light emitter 206 may be selected to emit a narrow band of wavelengths with the center wavelength $\lambda c$ being one of several wavelengths within the band. In another embodiment, the semiconductor light emitter 206 comprises a laser diode having a single wavelength emitted from the high-gain region, and the single wavelength is the center wavelength $\lambda c$. In the several embodiments, the initial center wavelength is selected to be responsive to a fluid component of interest. For example, the center wavelength may be selected to indicate presence of a hydrocarbon compound or oil-based mud. Formation fluid compounds often include carbon C1 to C4 compounds. In several embodiments, the center wavelength is selected to be responsive to C1 to C4 compounds. In other embodiments, the center wavelength is selected to be responsive to higher carbon compounds, for example C5 and above. The light response may include attenuated reflection, absorbance, fluorescence or any other useful light response when interacting with a particular compound.

In several embodiments, $\lambda c$ may be varied on the order of about 4 nm by varying the internal temperature of the semiconductor light emitter at the high gain region to thermally tune the device. In one non-limiting example, the temperature may be changed by varying a current pulse applied to the semiconductor light emitter. In the example shown, the current applied is in the form of an electrical current pulse train controlled by a variable pulse generator 216. Any number of variable pulse generators 216 may be used to supply variable current pulses to the semiconductor light emitter 206. In the non-limiting example shown, the variable pulse generator 216 includes an oscillator circuit 218 that generates an oscillating voltage signal. Applying current pulses to the semiconductor may be accomplished in any number of ways depending on the particular type of light emitter used. For example, the semiconductor light emitter 206 may be a two-electrode device and the pulse train may be applied directly to the electrodes used to bias the high-gain region of the device. In another example, the semiconductor light emitter may include a heater layer adjacent the high-gain region. Devices having a heater layer may include three or more electrodes where additional electrodes are used for applying a pulse train to the heater layer. In one particular embodiment, a three-electrode design may be used where a pulse train is applied to one of the electrodes while a threshold current is applied to another electrode for generating light.

A duty-cycle control circuit 220 may be used to generate a voltage that is variable between the values of the peak-to-peak output of the oscillator circuit 218. In one example, a full wave rectifier circuit may be used to invert the negative portion of the oscillator circuit 218 output. In this manner, the duty cycle control circuit 220 output may be varied from about zero to about the peak value of the oscillator circuit 218 output.

The output of the oscillator circuit 218 and the output of the duty cycle control circuit 220 are each fed to a comparator circuit 222. In the example of FIG. 2, the comparator circuit 222 provides an output current whenever the oscillator 218 output signal is greater than the output signal of the duty cycle control circuit 220. Thus, the comparator output is a series of current pulses, i.e. a pulse train, and the pulse width of the pulses is controlled by the level applied by the duty cycle control circuit 220. A pulse width modulation from about 1% to about 100% may be achieved using methods according to the disclosure.

In some cases, an optional feedback circuit 224 may be used monitor the energy output of the semiconductor light emitter 206 and with the controller 214 to further control the variable pulse generator 216.

Figure 3:
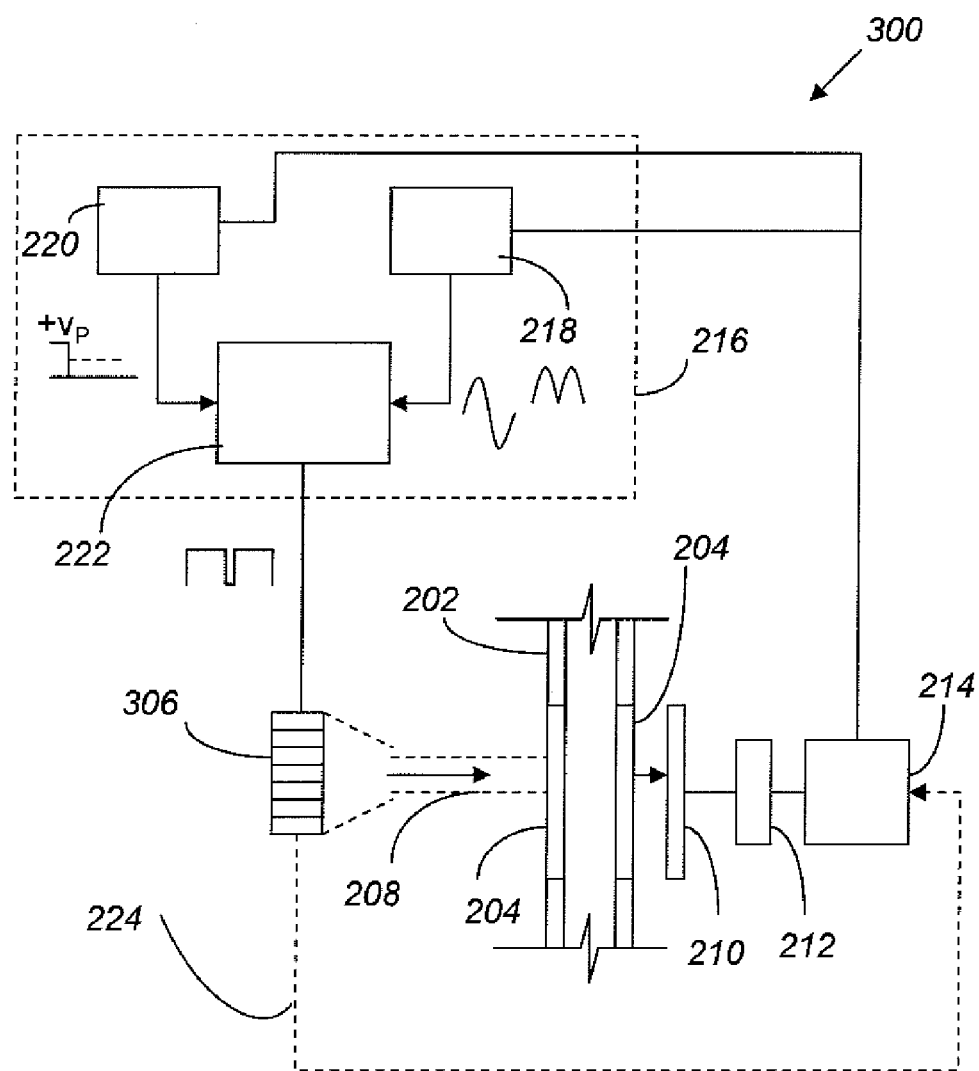
FIG. 3 is another example of an optical tool for estimating a fluid property where a light source includes an array of semiconductor light emitters.

FIG. 3 illustrates another example of an optical tool 300 that is similar to the example described above and shown in FIG. 2. In this example, an array of semiconductor light emitters 306 is used instead of the single emitter example of FIG. 2. Each of the semiconductor light emitters 306 may be substantially similar to the individual semiconductor light emitter 206 discussed above and shown in FIG. 2. For example, the array 306 may include edge-emitting laser diodes. In one embodiment, the semiconductor light emitter array 306 may be a VCSEL device. In other embodiments the semiconductor light emitter may be a non-laser device. Each light emitter of the array 306 includes an electrode for receiving operating current. An electrical current pulse train may be applied to the operating current electrode or to a separate heater electrode as discussed above.

Using an array 306, whether narrow band or laser, the center wavelength of each emitter may be varied to cover a wider range of selected wavelengths. The individual emitters need not have consecutive wavelengths, however, using emitters such as lasers with consecutively-spaced center wavelengths spaced within the tunable 4-nm spread allows for a controllable sweep throughout the bandwidth of the array. For example, 5 lasers may be used to sweep a 20 nm band of wavelengths where each laser is tuned within a 4 nm spread.

Figure 4:
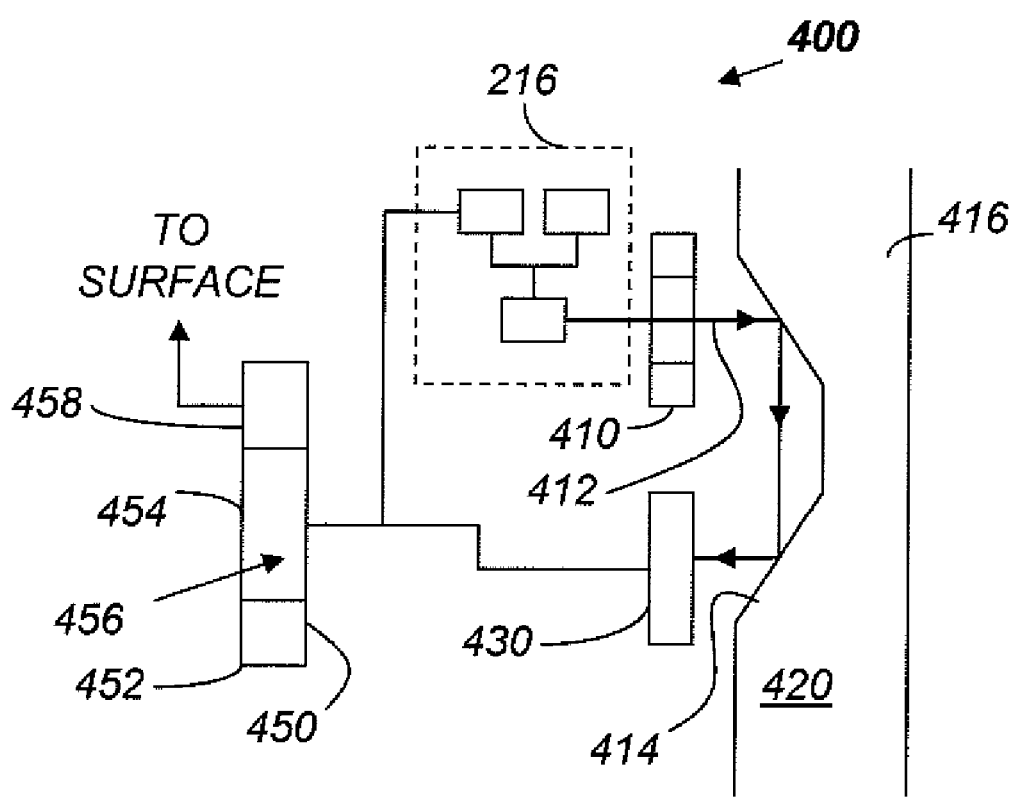
FIG. 4 schematically represents yet another non-limiting optical tool for estimating a fluid property.

The examples of FIGS. 2 and 3 show light interacting with fluid in a fluid cell 204 by passing through the fluid cell. In some cases, attenuated total reflectance (ATR) may be accomplished by using other configurations considered within the scope of the disclosure. Turning now to FIG. 4, a schematic diagram illustrates a Raman spectrometer 400 that may be used downhole for analyzing fluid withdrawn from a formation. The Raman spectrometer 400 includes a UV laser array 410 that induces or pumps UV light 412 into a fluid 420 through a window 414 made into a wall of a fluid chamber 416. The light path from the array 410 to the window 414 may be an optical fiber as described above with reference to FIG. 2. The UV laser array 410 of this example includes multiple lasers producing UV light within a relatively narrow wavelength band. Alternatively, the UV laser array 410 may produce multiple monochromatic (single wavelength) UV light from each laser. Each emitter in the array 410 is tunable using a variable pulse generator 216 substantially similar to the generator described above. Likewise, each light emitter produces a center wavelength responsive to a selected fluid compound.

The light 422 interacts with the fluid 420 and a portion of the light is reflected back to a detector 430. The detector produces a signal in response to the light, which signal is then received by a controller 450 for analysis. The controller 450 may further be used as a modulator for the array 410 to modulate the light emitted from the array 410. The controller 450 may include a processor 452, and memory for storing data 454 and computer programs 456. The controller 450 receives and processes the signals received from the detector 430. In one aspect, the controller 450 may analyze or estimate the detected light and transmit a spectrum of the Raman scattered light to a surface controller using a transmitter 458. In one aspect, the controller 450 may analyze or estimate one or more properties or characteristics of the fluid downhole and transmit the results of the estimation to a surface controller using the transmitter 458. In another aspect, the controller 450 may process the signals received from the detector 430 to an extent and telemeter the processed data to a surface controller for producing a spectrum and for providing an in-situ estimate of a property of the fluid, including the contamination level of the mud in the formation fluid.

The spectrometer 400 includes a variable pulse generator 216 substantially similar to the variable pulse generator 216 described above and shown in FIG. 2. Each laser in the array 410 has a center wavelength that may be thermally tuned using the generator 216. The generator 216 may be controlled using the downhole controller 450 or by a not-shown surface controller.

Figure 5:
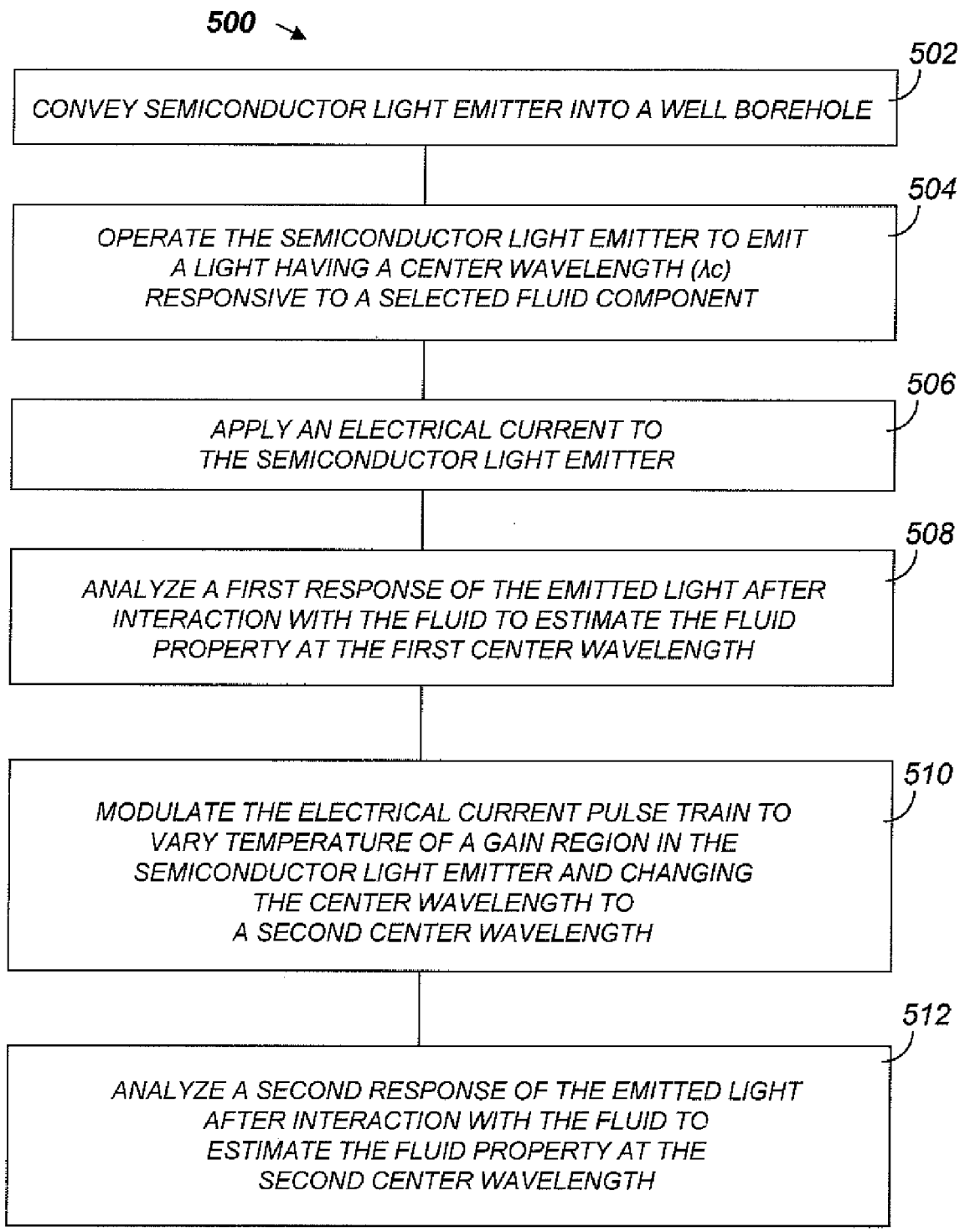
FIG. 5 illustrates a method for estimating a fluid property downhole according to the disclosure.

The several device embodiments described above and shown in FIGS. 1-4 will help understand several non-limiting examples of a method to estimate fluid properties. FIG. 5 illustrates one non-limiting example of a method for estimating a fluid property downhole. The method 500 includes conveying a semiconductor light emitter in a well borehole 502. In several embodiments, the semiconductor light emitter 502 includes a gain region that produces light. The method further includes emitting a light from the semiconductor light emitter toward a fluid sample 504. The emitted light has a center wavelength that is responsive to a selected fluid property. An electrical current pulse train is applied to the semiconductor light emitter 506, and a first response of the emitted light is analyzed after the light interacts with the fluid sample to estimate the fluid property at the center wavelength 508. The electrical current pulse train is then modulated 510 to vary a temperature of the gain region and the changing temperature moves the center wavelength in the emitted light to a second center wavelength. A second response of the emitted light may then be analyzed after interaction with the fluid to estimate the fluid property at the second center wavelength 512.

In several embodiments, a laser light having a single wavelength may be emitted according to the method or the light emitted may have a narrow band width having a plurality of wavelengths. Modulating the electrical pulse train may include modulating a pulse width, which includes changing a duty cycle of pulses in the pulse train within a range of about 1% to about 100%. The semiconductor light source may comprise a plurality of lasers and the method may include emitting a plurality of individual single wavelength laser lights.

The initial center wavelength may be selected to be responsive to a hydrocarbon compound including compounds of C1 to C4. The center wavelength may also be selected to include an oil-based mud percentage.

In one aspect, analyzing the first response includes estimating a light absorbance. In another aspect, analyzing the first response includes estimating a light reflectance.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

What is claimed is:

1. A method for estimating a property of a fluid downhole, the method comprising;
    conveying a semiconductor light emitter in a well borehole, the semiconductor light emitter having a gain region that produces light;
    emitting a light from the semiconductor light emitter toward a fluid sample, the emitted light having a first center wavelength responsive to a selected fluid property;
    applying an electrical current pulse train to the semiconductor light emitter, the electric current pulse train having a duty cycle;
    analyzing a first response of the emitted light after interaction with the fluid sample to estimate the fluid property using the first center wavelength;
    changing the duty cycle of the electrical current pulse train to vary a temperature of the gain region to change the first center wavelength in the emitted light to a second center wavelength; and
    analyzing a second response of the emitted light after interaction with the fluid to estimate the fluid property using the second center wavelength.

2. A method according to claim 1, wherein emitting a light comprises emitting a laser light having a single wavelength.

3. A method according to claim 1, wherein emitting a light comprises emitting a narrow band light having a plurality of wavelengths.

4. A method according to claim 1, wherein changing the duty cycle comprises modulating a pulse width.

5. A method according to claim 1, wherein changing the duty cycle includes changing the duty cycle within a range of about 1% to about 100%.

6. A method according to claim 1, wherein the selected fluid property includes a hydrocarbon compound.

7. A method according to claim 6, wherein the hydrocarbon compound is one or more of a C1 to C4 compound.

8. A method according to claim 1, wherein the selected fluid property includes an oil-based mud percentage.

9. A method according to claim 1, wherein the semiconductor light source comprises a plurality of lasers, and wherein emitting a light comprises emitting a plurality of individual single wavelength laser lights.

10. A method according to claim 1, wherein analyzing the first response includes estimating one or more of i) a light absorbance, ii) a light reflectance, and iii) a light attenuation.

11. A method according to claim 1, wherein the semiconductor light emitter comprises two electrodes for biasing a high-gain region, a heater layer adjacent the high-gain region and a third electrode connected to the heater layer, wherein applying an electrical current pulse train to the semiconductor light emitter includes applying an electrical current pulse train to the third electrode.

12. An apparatus for estimating a property of a fluid downhole, the apparatus comprising;
    a carrier that conveys one or more tools into a well borehole;
    a semiconductor light emitter having a gain region that produces light having a first center wavelength responsive to a selected fluid property, the semiconductor light emitter being carried by the carrier;
    an electrical current source that applies an electrical current pulse train to the semiconductor light emitter, the electric current pulse train having a duty cycle;
    an analyzer device that analyses a first response of light emitted from the semiconductor light source after emitted light interacts with the fluid, the analyzed first response being used to estimate the fluid property using the first center wavelength; and
    a current modulator changes the duty cycle to vary a temperature of the gain region to change the first center wavelength in the emitted light to a second center wavelength,
    wherein a second response of the emitted light is analyzed by the analyzer device after interaction with the fluid to estimate the fluid property using the second center wavelength.

13. An apparatus according to claim 12, wherein the semiconductor light source comprises a laser emitting a laser light having a single wavelength.

14. An apparatus according to claim 12, wherein the semiconductor light source comprises a light source emitting a narrow band light having a plurality of wavelengths.

15. An apparatus according to claim 12, wherein the current modulator modulates a pulse width of pulses in the electrical pulse train.

16. An apparatus according to claim 12, wherein the duty cycle is changed within a range of about 1% to about 100%.

17. An apparatus according to claim 12, wherein the selected fluid property includes a hydrocarbon compound.

18. An apparatus according to claim 17, wherein the hydrocarbon compound is one or more of a C1 to C4 compound.

19. An apparatus according to claim 12, wherein the selected fluid property includes an oil-based mud percentage.

20. An apparatus according to claim 12, the semiconductor light source comprises a plurality of lasers that emits a plurality of individual single wavelength laser lights.

21. An apparatus according to claim 12, wherein the first response includes one or more of i) a light absorbance, ii) a light reflectance, and iii) a light attenuation.

22. An apparatus according to claim 12, wherein the semiconductor light emitter comprises two electrodes for biasing a high-gain region, a heater layer adjacent the high-gain region and a third electrode connected to the heater layer for receiving the electrical current pulse train.

* * * * *